United States Patent [19]

Huang

[11] Patent Number: 5,748,882
[45] Date of Patent: May 5, 1998

[54] APPARATUS AND METHOD FOR FAULT-TOLERANT COMPUTING

[75] Inventor: Yennun Huang, Bridgewater, N.J.

[73] Assignee: Lucent Technologies Inc., Murray Hill, N.J.

[21] Appl. No.: 643,274

[22] Filed: May 8, 1996

Related U.S. Application Data

[63] Continuation of Ser. No. 301,362, Sep. 6, 1994, abandoned, which is a continuation of Ser. No. 954,549, Sep. 30, 1992, abandoned.

[51] Int. Cl.[6] .................... G06F 11/00; G06F 11/08
[52] U.S. Cl. .................. 395/184.01; 395/182.13; 395/200.11; 395/200.12; 364/264.7; 364/269.4; 364/268.9; 364/285.3
[58] Field of Search ................ 395/184.01, 183.14, 395/182.09, 182.11, 182.14, 182.21, 182.13, 182.18, 183.07, 183.2, 200.11, 200.12; 364/264.7, 269.4, 268.9, 285.2, 285.3

[56] References Cited

U.S. PATENT DOCUMENTS

| | | | |
|---|---|---|---|
| 3,876,987 | 4/1975 | Dalton et al. | 395/182.08 |
| 4,539,655 | 9/1985 | Trussell et al. | 364/900 |
| 4,635,258 | 1/1987 | Salowe | 395/184.01 |
| 4,805,107 | 2/1989 | Kieckhafer et al. | 364/200 |
| 4,819,159 | 4/1989 | Shipley et al. | 371/9.1 |
| 4,852,092 | 7/1989 | Makita | 395/182.15 |
| 4,868,818 | 9/1989 | Madan et al. | 371/11.3 |
| 4,914,657 | 4/1990 | Walter et al. | 371/11.3 |
| 4,933,940 | 6/1990 | Walter et al. | 371/11.3 |
| 4,979,105 | 12/1990 | Daly et al. | 395/182.08 |
| 4,980,857 | 12/1990 | Walter et al. | 364/943.9 |
| 4,989,133 | 1/1991 | May et al. | 364/200 |

(List continued on next page.)

OTHER PUBLICATIONS

B. Randell, "System Structure for Software Fault Tolerance", *IEEE Transactions on Software Engineering*, vol. SE-1, No. 2, Jun. 1975.

A. Avizienis, "The N-Version Approach to Fault-Tolerant Software", *IEEE Transactions on Software Engineering*, vol. SE-11, No. 12, Dec. 1985.

Y. Huang "Effect of Fault Tolerance on Response Time-Analysis of the Primary Site Approach", *IEEE Transactions on Computers*, vol. 41, No. 4, Apr. 1992.

*Primary Examiner*—Robert W. Beausoliel, Jr.
*Assistant Examiner*—Dieu-Minh Le
*Attorney, Agent, or Firm*—Donald P. Dinella; Jeffrey M. Weinick; Gordon E. Nelson

[57] ABSTRACT

Techniques for fault-tolerant computing which do not require fault-tolerant hardware or a fault-tolerant operating system. The techniques employ a monitor daemon which is implemented as one or more user processes and a fault-tolerant library which can be bound into application programs. A user process which is executing on ordinary hardware under an ordinary operating system is made fault tolerant by registering it with the monitor daemon. The degree of fault tolerance can be controlled by means of the fault-tolerant library. Included in the fault-tolerant library is a function which defines portions of a user process's memory as critical memory, a function which copies the critical memory to persistent storage, and a function which restores the critical memory from persistent storage. The monitor daemon monitors fault-tolerant processes, and when such a process hangs or crashes, the daemon restarts it. When the techniques are employed in a multi-node system, the monitor daemon on each node monitors one other node in addition to the processes in its own node. In addition, the monitor daemon may maintain copies of the state of fault-tolerant processes running at least on the monitored node. When the monitored node fails, the monitor daemon starts the processes from the monitored node for which the monitor daemon has state on its own node. When a node leaves or rejoins the multi-node system, what other node a given monitor daemon monitors is automatically redetermined for the new configuration of the multi-node system.

29 Claims, 3 Drawing Sheets

U.S. PATENT DOCUMENTS

| | | | |
|---|---|---|---|
| 5,003,466 | 3/1991 | Schan, Jr. et al. | 364/230.4 |
| 5,050,070 | 9/1991 | Chastain et al. | 364/200 |
| 5,109,329 | 4/1992 | Strelioff | 395/725 |
| 5,157,663 | 10/1992 | Major et al. | 371/9.1 |
| 5,257,369 | 10/1993 | Skeen et al. | 395/650 |
| 5,280,606 | 1/1994 | Jippo et al. | 395/181 |
| 5,295,258 | 3/1994 | Jewett et al. | 395/575 |
| 5,319,645 | 6/1994 | Bassi et al. | 371/19 |
| 5,361,362 | 11/1994 | Benkeren et al. | 395/725 |
| 5,363,502 | 11/1994 | Kagimasa et al. | 395/575 |
| 5,363,503 | 11/1994 | Gleeson | 395/575 |
| 5,386,544 | 1/1995 | Nakamura | 395/575 |
| 5,452,443 | 9/1995 | Oyamada et al. | 395/182.08 |

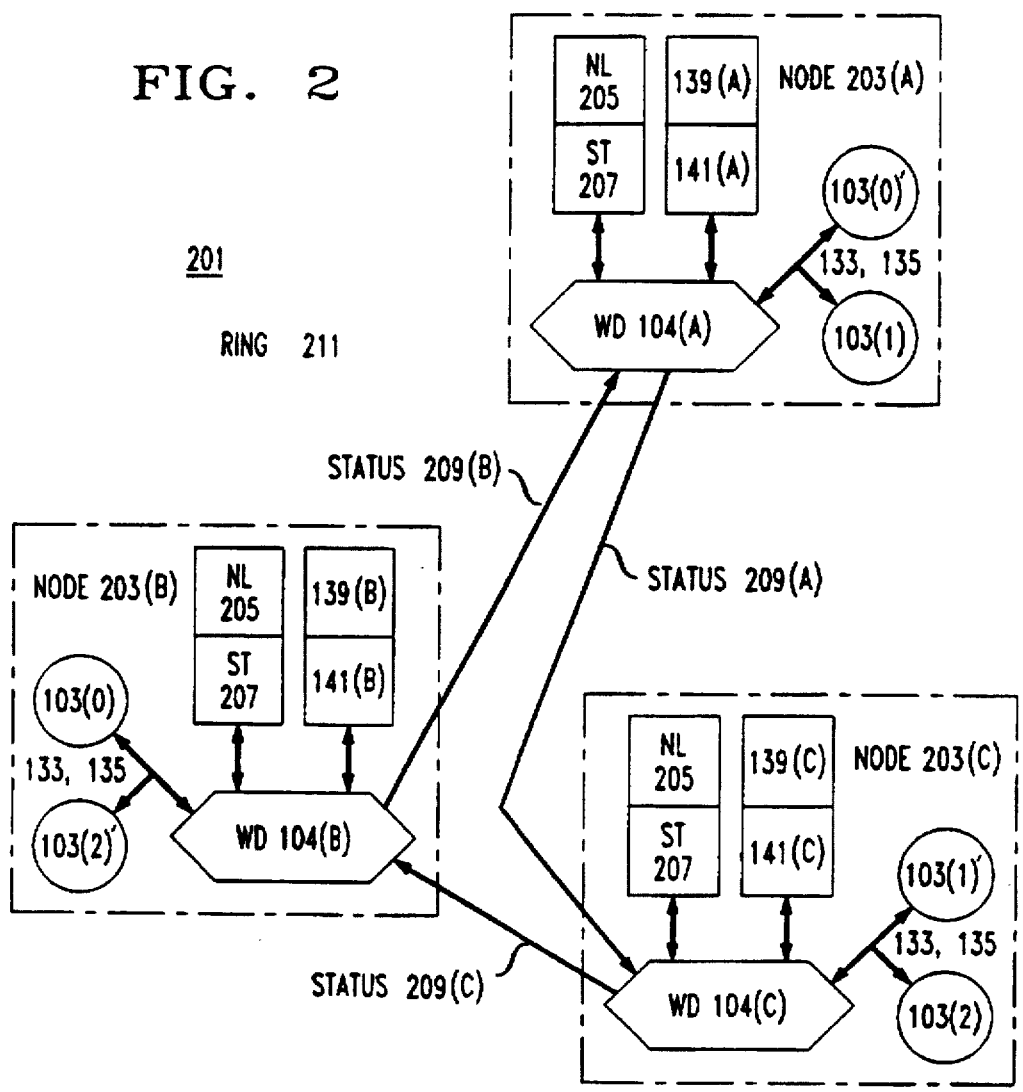

APPARATUS AND METHOD FOR FAULT-TOLERANT COMPUTING

This application is a continuation of application Ser. No. 08/301,362, filed on Sep. 6, 1994, now abandoned which is a continuation of application Ser. No. 07/954,549, filed on Sep. 30, 1992, now abandoned.

1 BACKGROUND OF THE INVENTION

1.1 Field of the Invention

The invention relates generally to fault-tolerant computing and more specifically to fault-tolerant computing at the level of the application program.

1.2 Description of the Prior Art

The systems we build today must be more tolerant of faults than formerly. Fault tolerance has two dimensions: availability and data integrity, that is, a state of consistency in the system. Switching systems need continuous availability. We need to increase the current levels of availability and data integrity in most of our other systems as well. Fault tolerance in those systems is often provided in the hardware and operating system layers.

Fault tolerance can be provided in the hardware using Duplex, Triple-Module-Redundancy or other hardware techniques, see for example, S. Webber and J. Beirne, *The Stratus Architecture,* Proceedings of the 21st Fault-Tolerant Computing Symposium, pp. 79–85, June 1991. Fault tolerance is also sometimes provided within the operating system using replicated file systems (see M. Satyanarayanan, Coda: *A Highly Available File System for a Distributed Workstation Environment,* IEEE Transactions on Computers, Vol C-39, pp. 447–459, April 1990), exception handling (see S. K. Shrivastava (ed.), Reliable Computer Systems, Chapter 3, Springer-Verlag, 1985) and other system routines.

A third layer of fault tolerance can be provided within the application software. Fault tolerance in the application layer can handle user and programming faults that are impossible to handle in the two bottom layers. Some user level faults may cause an application to hang or die; the underlying hardware and operating system may not provide any facility to handle such faults, i.e., detecting those faults and restarting and recovering the application from those faults automatically are possible only at the user level. Some programming faults may need to be handled within an application by providing an alternative algorithm to do the same computation or employing a voting approach. Facilities to use those software fault-tolerance features are not appropriate in the underlying hardware or operating systems.

Software fault tolerance can be provided in an application whether or not the underlying hardware or operating system is fault-tolerant. Actually, it is sometimes more economical to provide fault-tolerance in the application software executing in a distributed non-fault-tolerant hardware than to provide it on a fault-tolerant hardware. It is also an easier migration path for making our current non-fault-tolerant products fault-tolerant.

The above advantages of software fault tolerance are well known, but in the past, individual applications have been made fault tolerant by programming them to include techniques such as watching the liveness of a process by a daemon process, periodic checkpointing of critical data, logging of messages/events, recovery blocks (see B. Randell, *System Structure for Software Fault Tolerance,* IEEE Transactions on Software Engineering, SE-1, No. 2, pp. 220–232, June 1975), N-version programming, (see A. Avizienis, *The N-version Approach to Fault-tolerant Software,* IEEE Transactions on Software Engineering, SE-11, No. 12, pp. 1491–1501, December 1985), transaction processing with logging and recovery mechanisms, executing a duplicate process on a hot spare processor, and so forth.

What has been lacking in this area, and what is provided by the present invention, is a standard set of components for software fault tolerance which are largely independent of hardware and operating systems and which can be easily used by application programs.

2 SUMMARY OF THE INVENTION

In one aspect, the invention is apparatus for fault tolerant computing which includes

- means in a computer system for providing a registration message specifying a first user process running in the computer system; and
- a daemon made up of at least one other user process running in the computer system for responding to the registration message by beginning to observe whether the first user process is unable to continue and restarting the first user process when the first user process is observed to be unable to continue.

In another aspect, the invention is apparatus for fault tolerant computing including

- a plurality of nodes, each node being capable of executing user processes including at least one first user process; and
- in at least one of the nodes, a daemon made up of at least one other user process running in the noded for observing if another one of the nodes is down, and restarting at least one of the first user processes from the other one of the nodes on the node to which the daemon belongs when the other one of the nodes is observed to be down.

Further aspects of the invention include techniques in multi-node systems for responding to the failure of a node, techniques for defining the state to be saved for a process and for determining when the state is to be saved and restored, techniques for copying state for a process to other nodes so that it is available in case of failure, techniques for maintaining consistency of process and node status information across nodes, and techniques for restarting a process after failure.

3 BRIEF DESCRIPTION OF THE DRAWING

FIG. 2 is an overview of the system for software fault tolerance of the present invention in a plurality of nodes.

FIG. 5 is a diagram of additional tables used in the preferred embodiment.

Figure 1:
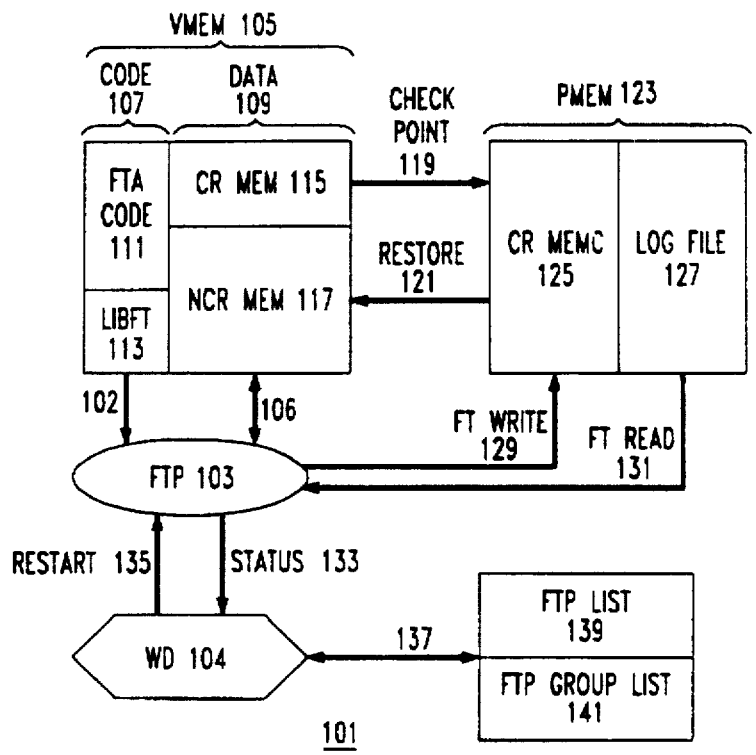
FIG. 1 is an overview of the system for software fault tolerance of the present invention in a single node.

Reference numbers in the Drawing have two parts: the two least-significant digits are the number of an item in a figure; the remaining digits are the number of the figure in which the item first appears. Thus, an item with the reference number 201 first appears in FIG. 2.

4 DETAILED DESCRIPTION OF A PREFERRED EMBODIMENT

The standard set of components for software fault tolerance described herein include a monitor for providing automatic fault detection and restart facilities and a fault-tolerant library of programs which may be used by any application program. The following Detailed Description will first present an overview of the monitor, termed herein the watchd daemon, or simply watchd and the fault tolerant library, termed herein libft, and of the manner in which they cooperate to permit application-level fault-tolerant computing and will then present details of their implementation in a preferred embodiment.

5 Overview of watchd and libft in a Single Node: FIG. 1 watchd and libft may be implemented in a system which consists only of a single node containing a processor and memory or in a system which consists of a plurality of such nodes which are connected into a network. The overview will begin by describing watchd and libft in a single node and will then describe them in a network of nodes. In a preferred embodiment, the nodes are workstations running the same operating system, for example SUN OS 4.1, a version of the UNIX operating system (UNIX is a registered trademark of AT&T). watchd is implemented using UNIX user processes and libft is implemented as a library of programs written in the "C" programming language.

FIG. 1 shows a system for application-level fault-tolerant computing 101 in a single node. System 101 includes one or more fault-tolerant processes 103. From the point of view of the operating system executing in the node, each fault-tolerant process is a user process. As such, each fault tolerant process 103 has a volatile memory 105. The memory is volatile in that it ceases to exist when the process 103 ceases to exist. Fault tolerant process 103 executes code 107 from volatile memory (VMEM) 105. Included in code 107 is fault-tolerant application (FTA) code 111 and libft code 113, which is bound together with code 111 when code 111 is compiled. Application code 111 invokes routines in libft code 113 to perform various operations which make recovery possible when fault tolerant process 103 crashes or hangs. When fault tolerant process 103 is executing on the node's processor, it executes instructions in code 107, as indicated by arrow 103, and performs operations on data 109, which is also stored in volatile memory 105. Routines in libft code 113 permit designation of part the portion of volatile memory 105 which is devoted to data as critical memory (CR MEM) 115. Other routines in libft code 113, indicated by arrow 119, permit fault tolerant process 103 to write data in CR MEM 115 to persistent memory 123 (typically a file system), where it appears in FIG. 1 as critical memory copy (CR MEMC) 125. This operation is termed checkpointing. When process 103 is restarted after it has hung or crashed, another routine in libft code 113 (indicated by arrow 121) permits process 103 to restore the data in CR MEM 115 from the copy at 125, as shown by arrows 119 and 121 respectively. Persistent memory 123 also may contain a log file 127, which contains a log of data messages resulting from special I/O read and write operations provided by libft 113. These operations appear as arrows 131 and 129, respectively. When process 113 is restarted, it consumes all of the messages in log file 127 before it begins performing I/O on other files.

Restarting of fault tolerant process 103 when it crashes or hangs is done by watchd daemon 104. Associated with watchd daemon 104 are two lists: fault tolerant process (FTP) list 139, which lists the fault-tolerant processes in the node which daemon 104 is to monitor, and fault-tolerant group (FTP Group) list 141, which lists groups of fault-tolerant processes 103 which must all be restarted if any fault-tolerant process 103 in the group hangs or crashes. As will be explained in more detail later, the entry for a fault-tolerant process 103 in list 139 indicates how the process 103 is to be monitored as well as any log files 127.

Daemon 104 continually monitors each fault tolerant process 103 specified in fault tolerant processor list 139 in the manner specified in fault tolerant list 139 to determine whether the process 103 is hung or has crashed, as shown by arrow 133. The monitoring may be either active, that is, watchd daemon 104 may poll process 103 to determine its condition, or passive, that is, there is a routine in libft 113 which, when executed by process 103, sends a signal to daemon 104 and specifies a time interval. If daemon 104 does not receive another signal from the routine before the end of the interval, daemon 104 presumes that process 103 is hung or has crashed.

When daemon 104 determines that fault-tolerant process 103 has crashed, daemon 104 restarts process 103 and any other processes 103 which belong to any group containing process 103 which is specified in group list 141. Restart proceeds as follows: after the process is restarted, any critical memory 115 is restored from critical memory copy 125. If the log file 127 exists, the restarted process then consumes the messages in log file 127;

There are several characteristics of system for fault-tolerant computing 101 which are worthy of mention here. First, system 101 requires no modification whatever of the hardware or operating system of the node upon which it operates. Fault-tolerant processes 103 are ordinary user processes and watchd daemon 104 is implemented using user processes. Further, libft and the code executed by watchd daemon are written in the C programming language and can be easily adapted to run under various operating systems. Second, in a node having a watchd daemon 104, any process can be made into a fault tolerant process 103 simply by incorporating routines from libft 113 into the code executed by the process. There is no longer any need for application programmers to continually re-implement fault tolerant features in their application code. Third, system 101 offers a high degree of flexibility. The routines in libft 113 permit the application programmer to provide his program with precisely the amount of fault tolerance required for his application. Options range from simply registering the process with watchd daemon 104, so that it will monitor the process and restart it if necessary through declaring part of the process's memory to be critical memory 115 and periodically saving critical memory 115 in critical memory copy 125 so that it can be restored after the process is restarted by daemon 104 to making a log of critical messages in log file 127 so that the restarted process can consume the messages.

6 Overview of watchd and libft in a System Having more than 1 Node: FIG. 2

While the system shown in FIG. 1 is perfectly adequate if the hardware or operating system of the single node never fails, it is of no help in the case of a hardware or operating system failure. That difficulty may be solved by taking advantage of the natural redundancy of a distributed system: while a given node in a distributed system may fail, it is extremely unlikely that all or even a good many of the nodes in the system will fail at the same time. Consequently, if a fault-tolerant process 103 on one node can be restarted on another node, the process 103 will tolerate hardware and operating system faults on the first node.

FIG. 2 shows such a distributed system. System 201 has three nodes 203, labelled A, B, and C. Each node has at least one processor and memory, as well as communications links for communicating with at least one of the other nodes. Each node has a watchd daemon 104 and can therefore also have fault-tolerant processes 103. There are three such fault-tolerant processes 103 in FIG. 2: 103(0), 103(1), and 103(2). Daemon 104 in each node monitors not only the status of processes 103 locally to it, but also the status of another node 203. In a preferred embodiment, the relationships between watching daemon 104 and the node 203 which it watches is such that the nodes 203 in system 201 form an adaptive ring 211 for fault diagnosis. Thus, daemon 104(A) watches node 203 (B), daemon 104(B) watches node 203(C), and daemon 104(C) watches node 104(A). Which nodes 203 the daemons 104 watch is determined by node list (NL) 205. An identical copy of node list 205 is available to daemon 104 in each node. When a node 203(i) fails, that fact is noted by watching daemon 104, and watching daemon 104 broadcasts messages to the surviving nodes to modify node list 205 to reflect the loss of node 203(i).

Of course, if watchd daemon 104 in a node is to restart a fault-tolerant process 103 from another node, it must have a copy of the state of that process 103. Thus, another function of daemons 104 in system 201 is to maintain copies of the state of processes 103. The state is stored in files and includes any copy of critical memory 125 and any logfile 127 for the process. The copies of the process state are designated in FIG. 2 by the process number and a' mark, as shown by the 103(1)' of the state of process 103(1) from node 203(A) on node 203(C) and the copy 103(0)' of the state of process 103(0) from node 203(B) on node 203(A). As may be seen from FIG. 2, the process state is copied from the watched node 203 to the node 203 of the watching watchd daemon 104. Copies are made by daemon 104 in the watched node and sent to the watching daemon 124 each time there is a significant change in critical memory copy 125 or in log file 127 for the process 103. In system 201, only a single copy is made, and thus restart is possible unless two adjacent nodes in the ring 211 of system 201 fail. It is of course possible to make more than one copy. For example, daemon 104(A) can provide a copy of the state for process 103(1) to daemon 104(C), which can in turn provide a copy of the state for that process to daemon 104(B), and in that case, all of the nodes of system 201 would have to fail in order to make it impossible to restart process 103(1).

As is apparent from the foregoing, each daemon 104 must know where each fault-tolerant process 103 is running in system 201. This information is contained in status table 207, of which each daemon 104 has an identical copy. As will be explained in detail below, status table 207 is kept consistent by having each watchd daemon 104 send a message when it starts or restarts a process to all the other daemons 104 and having each daemon 104 respond to such a message by updating status table 207 as required by the message.

When a node 203(i) returns to service, watchd daemon 104(i) in that node obtains a copy of status table 207 from the daemon 104 in the node watched by daemon 104(i). Status table 207 indicates which nodes 203 are currently executing the processes 103 local to node 203(i) and the files containing the state which is required to restart those processes. Daemon 104(i) obtains copies of the files from the nodes currently executing the processes and restarts the processes using the copies. As indicated above, when daemon 104(i) restarts a process, it sends a message to the other daemons 104 in system 201, and if a daemon 104 is running the restarted process, that daemon 104 ceases running the process and modifies its status table 207 to indicate that the process 103 is now running on node 203(i). All of the other daemons 104 simply modify their status tables 207 as just indicated.

Each daemon 104 operates according to the following algorithm. In the algorithm, each fault tolerant process 103 has an identifier (indicated by i. In addition, there are four auxiliary variables are used in the protocol:

1. $p_i$: the name of the primary node on which process i is supposed to run; this information can be found from status table 207;
2. $f_i$: number of consecutive failures of process i;
3. LocalHost: local host name;
4. MyWard: the name of the node that I am supposed to watch;
5. MyOldWard: the name of the node that I previously watched;

The critical state files of the algorithm contain critical memory copy 125 and log file 127 for the process. These files can be maintained by mechanisms provided by the developers of the program executed by the process or they may be maintained by mechanisms provided by libft fault tolerant library 113.

1. /* Initialization */
   (a) get status tables 205 and 207 from a working node 203 (randomly chosen);
      if no other node 203 is alive, initialize the status tables;
   (b) for each process i which should run locally,
     i. get $p_i$ from the status table;
     ii. get the most recent state of the process from node $p_i$;
     iii. restart process i and globally update status tables;
2. Loop forever
BEGIN
   (a) loop for each process i:
     BEGIN
     i. get $p_i$ from the status table;
     ii. if $p_i$=LocalHost
       A. if process i is alive and not hung,
          $f_i$=0;
          continue;
       B. increment $f_i$;
       C. if $f_i$<$max_i$,
          restart process i and globally update status tables;
         else if $f_i$=$max_i$,
          inform the backup node to recover process i;
         else if $f_i$>$max_i$,
          print out an urgent warning message;
     iii. else if node MyWard just failed,
       A. Set MyOldWard to MyWard;
       B. Find my new ward and set MyWard to my new ward;
       C. if $p_i$=MyWard, /* I becomes the backup of the process */ copy all critical state files of process i from MyWard;
       D. else if $p_i$=MyOldWard, /* the primary node for the process just failed */
          restart process i and globally update status tables;
          copy all critical state files to my backup;
     iv. else
       A. if process i is running locally, stop running the process;
     END;
   (b) wait for an event (time out or process crash);
END;

6.1. An Example of Node Failure and Return to Service

To see how node failure and return to service works in more detail, consider the previous system with nodes 203

(A), 203(B), and 203(C) as an example. To simplify the discussion, we consider only a single process 103, named yeastd. We assume that the process periodically saves its state onto a file named yeastd.sta and has a log file yeastd. log. Node A watches node B, node B watches node C, and node C watches node A. At the beginning, all nodes are alive and process yeastd is running on node A. Let's consider the following scenarios.

1. node C is down node A does nothing;

node B copies files yeastd.sta and yeastd.log from node A, and starts watching node A and process yeastd;

2. node C rejoins the system node A does nothing;

node C copies files yeastd.sta and yeast.log from node A, and starts watching node A and process yeastd;

node B stops watching node A and starts watching node C;

3. node A is down node C restarts process yeastd, globally updates status table 207 and node list 205, and starts watching node B;

node B copies files yeastd.sta and yeastd.log from node C and starts watching node C and process yeastd;

4. node A rejoins the system node A copies files yeastd.sta and yeastd.log from node C, restarts process yeastd, globally updates status table 207 and node list 205, and starts watching node B;

node C stops running the yeastd process, stops watching node B, and starts watching node A;

node B stops watching process yeastd;

5. process yeastd crashes but node A is alive node A restarts the process; if the restart fails a specified number of times, node A informs node C to recover the process;

node C either does nothing or restarts the yeastd process and globally updates status table 207 if it is asked by node A;

node B either does nothing or copies state files (yeastd.sta and yeastd.log) from node C, and starts watching process yeastd on node C if the process is restarted by node C.

Each daemon 104 maintains a status table 207. When a process is restarted on a node, daemon 104 for the node sends update messages to all other nodes.

Note that when a network transient failure occurs or when a node 203 rejoins the system, more than one copy of a process 103 could be running at the same time. In order to guarantee that only one active copy of the process is running at any time, each watchd daemon 104 has to constantly check if a process 103 which is supposed to run on some other node 103 is also running locally. If it is, daemon 104 has to stop its node 103 from running the process 103 by sending a termination signal to the process. For instance, let's consider scenario 4 in the previous example. After node A fails, process yeastd which was running on node A is restarted on node C. After a while, node A is repaired and rejoins the system. The watchd daemon on node A reads fault tolerant processes list 139 and knows that node A should run process yeastd. It first read the most current status table 207 from a working node, say node B, and finds that process yeastd is currently running on node C. To take over the responsibility of running the yeastd process, node A first copies the state files of the process from node B and then restarts the process. If the process is restarted successfully, the watchd daemon on node A broadcasts an update message to all other nodes to update their status tables 207. After the update, node C finds that node A has been up and yeastd process has been running on node A. Hence, node C no longer has to run the process. In this case, daemon 104(C) sends a termination signal to process 103 running in node 203(C). Note that the protocol lets node A take over process yeastd when it rejoins the system. This step is needed for load balancing. Without this step, all processes 103 will be eventually running only on the node 203 which fails last.

6.2. An example of Ring Reconfiguration

Whenever ring 211 is reconfigured (due to failures or repairs), copying critical state files between nodes 203 is needed. For instance, let's consider scenario 3 in the above example (assuming that the degree of replication is 2). Before node A fails, process yeastd on node A checkpoints its state onto node C but not onto node B. Therefore, node B does not have the state of process yeastd. Upon the failure of node A, node C restarts the process with its previous state and, at the same time, node B copies the state file of the process (i.e. yeastd) from node C. The copy of the state file from node C to node B is needed for handling the possibility of failure of node C in recovery. Otherwise, if node C fails again before a checkpoint can be established, node B cannot recover the process since it does not have the state of the process.

7 Details of watchd Daemon 104

Figure 3:
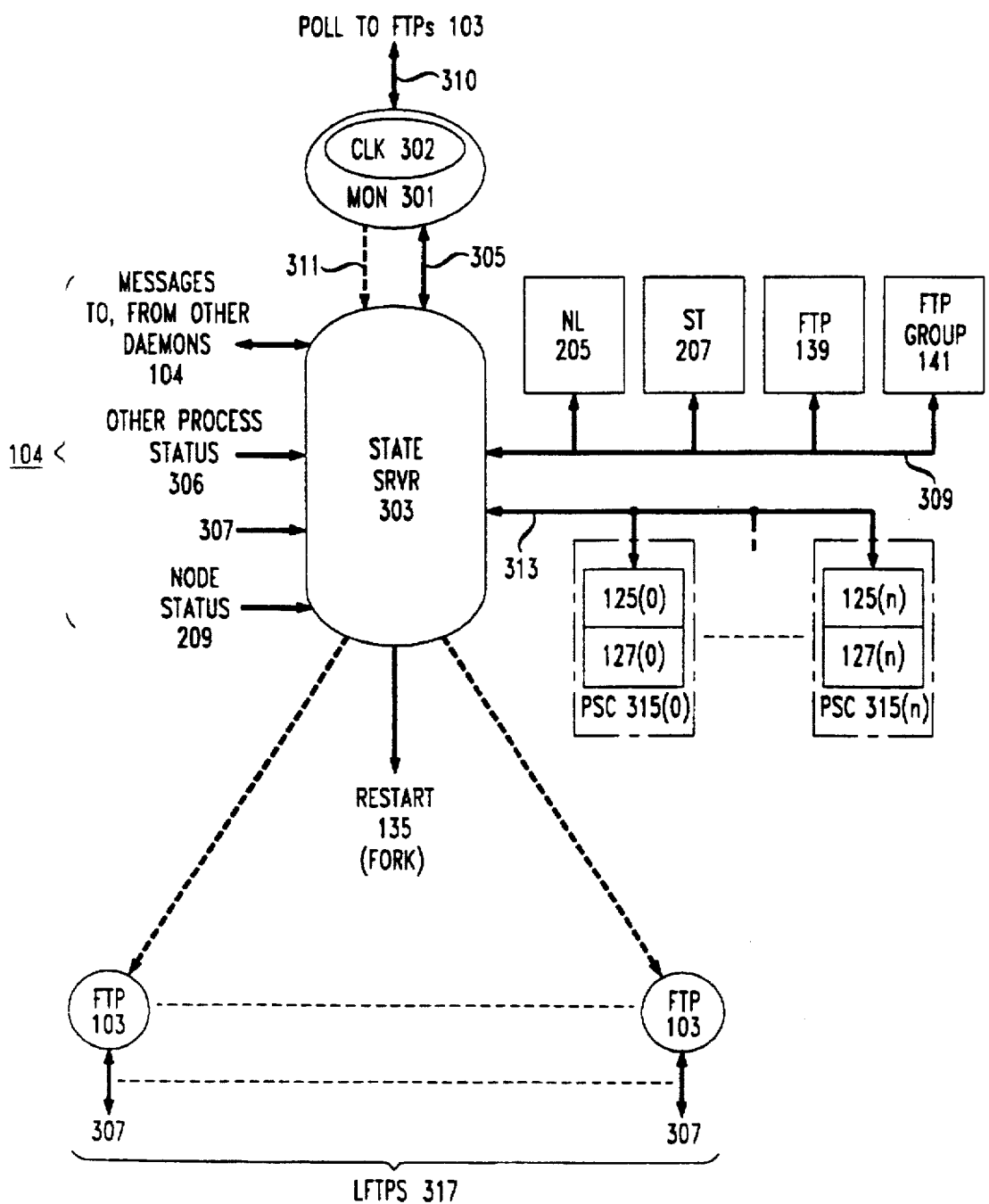
FIG. 3 is a diagram of a preferred embodiment of the present invention.

FIG. 3 shows how daemon 104 is implemented in a preferred embodiment. In FIG. 3, solid arrows show the flow of information and the dotted arrows show parent-child relationships among processes. watchd daemon 104 is implemented by means of two user processes: monitor (MON) 301 and state server (STATE SRVR) 303. There are two reasons for this design:

In order to minimize the possibility of failure of daemon 104, it must include a component which is simple enough so that incorrect execution is exceedingly improbable; and Daemon 104 must be able to perform both time-dependent and asynchronous operations, and the asynchronous operations cannot be allowed to interfere with the time-dependent operations.

Beginning with monitor 301, monitor 301 does the following:

When monitor 301 begins running, it performs initialization operations including using the UNIX operating system's FORK function to create state srvr 303;

After initialization, monitor 301 does the following:

1. It polls processes 103 to determine whether they have crashed;
2. It watches clock 302 to determine if it is time to send state srvr 303 a message;
3. It sends state srvr 303 messages when polling indicates that a process 103 has died or when a time message needs to be sent; and
4. If state srvr 303 has crashed, monitor 301 restarts state srvr 303.

All other operations of monitor 104 are performed by state srvr 303. In particular, state srver 303 determines by methods other than polling whether watched node 209 is alive and whether processes 103 have crashed or are hung, maintains tables 139, 141, 205, and 207, and provides backup copies of process state to other nodes.

Continuing with the operations performed by monitor 301 in more detail, monitor 301 polls to determine whether a fault-tolerant process 103 has crashed by using the UNIX operating system's kill system call, which, when used with signal 0, does not affect the behavior of the process being checked, but does return an error value if the process is dead. The polling is represented in FIG. 3 by arrow 310. When monitor 301 detects that a process 103 is dead, it sends a message (indicated by arrow 305) to state srvr 303, which restarts the process. Monitor 301 keeps track of significant times in response to messages from state srvr 303 which indicate which times are significant. When the significant time occurs, monitor 301 sends a message indicating the time to state srvr 303 (indicated by arrow 305). Monitor 301 detects that state srvr 303 has crashed by means of the UNIX operating system's SIGCHLD signal, which the parent of a process receives when the child dies.

The remaining operations of daemon 104 are performed by state srvr 303. State srvr 303 communicates with daemons 104 in other nodes 203, as shown by arrow 311 and monitors the status of fault-tolerant processes 103 which are running locally by techniques other than polling, as shown by arrow 306 and the status of the next node 203 in ring 211, as shown by arrow 209. State srvr 303 monitors the status of the next node 203 by sending a message to that node's daemon 104; if the daemon 104 does not respond, the next node 203 is presumed to be down. On detecting that the next node 203 is down, state srvr 303 sends a message indicating that the node is down to the other daemons 104 and does the work which is necessary in its node 203 to reconfigure ring 211.

The techniques used by state srvr 303 to determine whether a local fault-tolerant process 103 has died or is hung include the following: As shown in FIG. 3, all fault-tolerant processes 103 which are operating on node 203 to which monitor 104 belongs (local fault tolerant processes (LFTPS 317 in FIG. 3) are children of state server 303. Consequently, when one of these processes 103 dies, state server 303 receives a SIGCHLD signal from the UNIX operating system indicating that one of its children has died.

State srvr 303 further actively determines whether a fault-tolerant process 103 is hung by using a UNIX operating system facility which sets a busy bit when a specified port of another process cannot accept a message and which then interrupts the process which sent the message when the busy bit is cleared. State srvr 303 uses this facility by sending a message to a process 103 and then waiting for a time interval (the end of the time interval is indicated by a message from monitor 301). If the busy bit is not cleared during the time interval, state srvr 303 determines that the process 103 is hung.

Finally, state srvr 303 can determine whether a fault-tolerant process 103 is hung by watching for messages which the process sends to monitor 301 whenever it executes the heartbeat function provided by libft 113. The message sent to the function specifies an interval which should not be exceeded before the next message from the process 103 arrives, and if state srvr 301 has not received the next message by the time the specified interval runs out, state srvr 303 determines that the process 103 is hung. Again, the timing is carried out by monitor 301.

In a preferred embodiment, when either monitor 301 or state srvr 303 determines that a local fault-tolerant process 103 has hung or crashed, state srvr 303 restarts the process 103 by using the UNIX operating system's FORK system call to create a new process which executes the same code as the 10 crashed or hung process and uses any critical memory copy 125 and/or log file 127 existing for the crashed or hung process 103 (arrow 135). If the restarted process 103 crashes or hangs again, state srvr 303 may send a message to the watching daemon 104 to indicate that it should restart the process 103 in the watching daemon 104's node. Of course, if the process 103 to be restarted has a critical memory copy 105 and/or a log file 127, the copy and the log file must have been copied to the watching daemon 104's node.

If node 203 to which daemon 104 belongs has been down and is resuming operation, state srvr 303 sends a message to all of the other daemons 104 indicating that node 203 has come up; similarly, state srvr 303 sends a message to all of the other daemons 104 whenever a fault-tolerant process 104 which has a copy on another node 203 is restarted in state srvr 303's node. Additionally, whenever a copy of a process 103's critical memory copy 125 or log file 127 needs to be sent to the node 203 which watches the node to which monitor 103 belongs, state srvr 303 sends a message containing the data to be copied to daemon 104 in the watching node.

State server 303 has the following additional functions in a preferred embodiment:

- it responds to certain libft functions invoked by fault-tolerant processes 103 (arrow 307);
- it maintains tables 139, 141, 205, and 207 in response to messages from monitor 301 (arrow 305), from other daemons 104 (arrow 311), and from the lcoal fault-tolerant processes 103 (arrow 307);
- it maintains process state copies 315 for local fault-tolerant processes 103 and fault tolerant processes 103 for which the node serves as a backup node (arrow 313) by providing such copies for other nodes 203 and receiving copies for other nodes 203.

Most of these functions involve fault-tolerant process table 139, fault-tolerant process group table 141, node list 205, and status table 207. In a preferred embodiment, all of these tables are maintained in files. In the following, these tables will be considered in detail.

Figure 4:
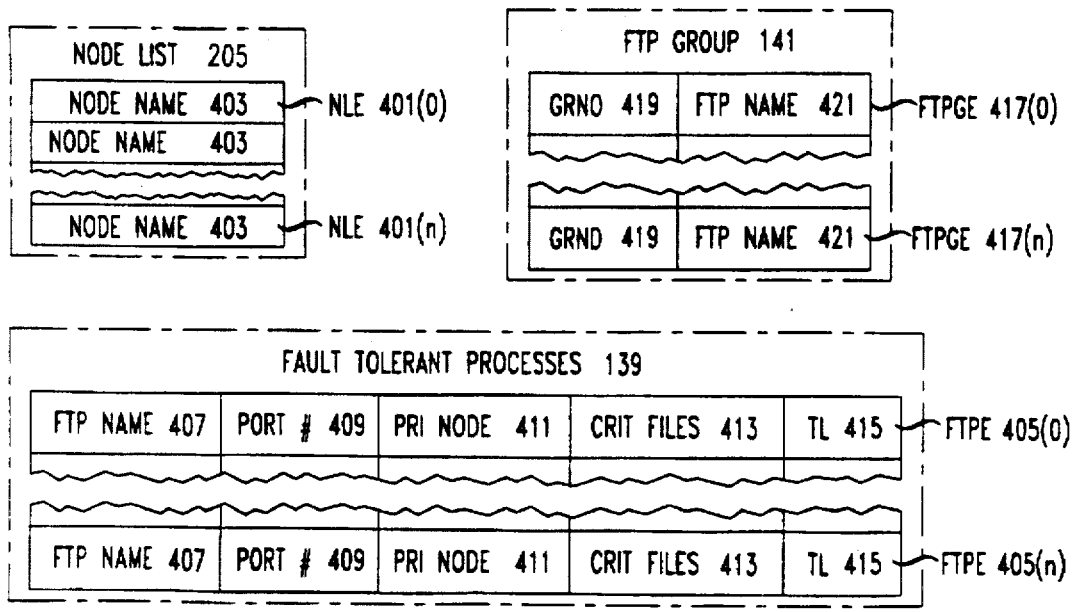
FIG. 4 is a diagram of tables used in the preferred embodiment.

7.1 Details of Lists 205, 139, and 141: FIG. 4

FIG. 4 shows three of these tables: node list 205, fault tolerant processes 139, and fault tolerant processes group 141. Beginning with node list 207, each node 203 in a system 201 has a single node list entry 401 in list 205; each node's entry simply contains the name 403 of the node 203. The order of the entries in list 205 determines the configuration of ring 211; that is, daemon 104 for a given node with an entry 403(j) in list 207 watches the node 203 with entry 403(j–1) and daemon 104 for node 203 with entry 403(0) watches node 203 with entry 403(n).

When state server 303 detects that the node 203 which it is watching is down or receives a message from another daemon 104 indicating that a node 203 is down, state server 303 removes the entry for the node from node list 205; if the removal affects which node 203 monitor 301 should be watching, state server 303 begins watching that node. When state server 303 receives a message from a daemon 104 indicating that the node 203 on which daemon 104 is running is rejoining system 201, it updates node list 205 as required and if required by the update, begins watching a different node 203. As is clear from the foregoing, each node 203 in a system 201 has an identical copy of node list 205.

Continuing with fault tolerant processes table 139, each fault-tolerant process 103 which currently may be or become active on the node to which daemon 104 belongs has an entry (FTPE) 405 in table 139. Each entry contains the following information about the process 103:

the name 407 of the fault-tolerant process; in a preferred embodiment, this is the pathname for the program being executed by the process;

the port number 409 for the port which to which monitor 301 is to send messages to determine whether the process 103 is crashed or hung;

the primary node name 411 for the node 203 on which process 103 is to run if that node 203 is up;

critical files 413, a list of the files which contain critical memory copy 125 and log file 127 for the process 103; and time limit (TL) 415, which is the maximum time which state srvr 303 should wait before concluding that process 103 is hung.

There are two sources for the information in a fault tolerant process entry 405. In the case of an entry 405 for a process 103 whose primary node is the node to which table 139 belongs, the information is provided by functions in libft which register the process 103 and any critical memory copy and/or logfile 127 with daemon 104. In such cases, primary node 411 contains the name of the node to which table 139 belongs. In the case of an entry 405 for a process 103 whose primary node is elsewhere, when state srvr 303 makes the entry in the primary node 203, it sends the contents of the entry to the watchd daemons 104 in one or more nodes 203 which are to back up the primary node and state servers 303 in the relevant nodes 203 add the information to their fault tolerant process tables 139. If there is one backup node specified, it will be the node whose watchd daemon 104 watches the primary node; if there is more than one, the remaining backup nodes will be the node whose daemon 104 watches the first backup node, and so forth.

Turning to fault tolerant group table 141, each entry 417 contains the name of a fault tolerant process 421 and a group number 419 indicating the group to which the fault tolerant process belongs. If a process 103 belonging to a group must be restarted, all processes 103 in the group are restarted at the same time. The sources of information for table 141 are the same as for table 139; in the case of local fault tolerant processes 103, the information is provided by libft functions; for those copied from other nodes, the information is provided by daemon 104 for the node being backed up.

As is apparent from the contents of fault tolerant process table 139 and fault tolerant group table 141, state srvr daemon 303 updates these tables every time the removal of a node 203 from system 201 or the restoration of such a node to the system changes ring 211 in such a way that information about different non-local fault-tolerant processes must be stored in the node 203 to which state srvr process 303 belongs. In a preferred embodiment, when state srvr process 303 is informed of a change in ring 211, state srvr process 303 updates node list 205 and then relays messages to the nodes 203 which contain the information which, given the new configuration of ring 211, must be copied into tables 139 and 141. The contents of tables 139 and 141 will of course differ from node 203 to node 203, depending on the local fault tolerant processes 103 running in a given node and on the given node's position in ring 211.

7.2 Detail of Status Table 207: FIG. 5

As before mentioned, every node in system 201 has an identical copy of status table 207. There is an entry in status table 207 for every fault tolerant process 103 running in system 201. Each entry contains the following fields:

Field 503 contains the process's name;

Field 505 contains the name of the node 203 upon which the process is currently executing;

Field 507 contains the port number used to communicate with the process on the current node;

Field 509 contains the process identifier for the process on the current node;

Field 511 contains a specification of the signal to which the UNIX operating system in which the preferred embodiment is implemented will respond by terminating the process; and Field 513 is a list of the critical files for the process.

The information in the above table is obtained in the following fashion: when a node 203 is added to system 201 (either because it is a new node or because it is resuming operation), state srvr 303 sends a message asking for a copy of status table 207 from an already-running node 203. When the copy is returned, state srvr 303 makes its status table 207 from that table. As previously mentioned, every time state srvr 303 on any node 203 starts or restarts a fault-tolerant process 103, it sends a message to all other daemons 104. The message specifies the process name, the name of the node which is starting the process, the port number, the process id, and the list of critical files. When state srvr 303 in a given node 203 receives the message, it makes an entry for the process in status table 207. If there is another entry for the process in status table 207, state srvr 303 deletes that entry. State srvr 303 also determines whether it is currently running the process 103 specified in the message. If there is a fault tolerant process table entry 405 for the process 103 and the entry indicates another node 103 as primary node 411, state srvr 303 terminates the local execution of the process. By this means, two ends are achieved: first, all copies of status table 207 in system 201 remain consistent, and second, a fault-tolerant process 103 will always run on its primary node 203 unless the primary node is down or otherwise unable to run the process.

7.3 Avoiding Corruption of Tables 139, 141, 205, and 207

In a preferred embodiment, each time state srvr 303 queries a table, it checks the data it obtains for corruption; if evidence of corruption is found, state srvr 303 fetches new copies of node list 205 and status table 207 from another node 203 and reconstructs all of the tables 139, 141, 205, and 207 from those tables. Similarly, whenever state srvr 303 updates or replaces a table, it updates or replaces the table and then checks for corruption. If any is found, new copies of the tables are fetched and/or made as just described.

8 Operation of Fault-Tolerant Systems 101 and 201

Fault tolerant system 101 and 201 are controlled in a preferred embodiment by commands executed by the UNIX operating system's shell process and by libft 113 routines. In the following, operation of systems 101 and 201 will be disclosed by means of a discussion of the commands and libft routines.

8.1 Commands for watchd Daemon 104

To start watchd daemon 104 on a node, we use watchd [n]

where n (the degree of replication) is the total number of nodes 203 which will have state copies 315 of processes running on the node 203 upon which daemon 104 is running. The default degree of replication is 2. The larger the n, the more robust are the processes. For example, if n is 2, a process may not be recoverable when 2 nodes fail simultaneously. On the other hand, if n is 3, a process is always recoverable for two simultaneous failures. However, the larger the n, the more overhead for the checkpoint operation. It has been shown that for practical systems with long expected life and short down time, the optimal degree of replication is 2 in terms of availability of the system. See Y. Huang and P. Jalote, "Effect of Fault tolerance on Response Time—Analysis of the Primary Site Approach" *IEEE Transactions on Computers*, 41(4):420–428, April, 1992.

To move a fault tolerant process from a node to another node, we use moveproc <proc> <node> where the <node> is the destination node. Note that no source node is needed because it can be found from status table 207. The purpose of this command is load balancing.

It allows processes to be moved to more lightly-loaded nodes to improve the response times of processes. Of course, when a process is moved, the fault tolerant processes tables 139 and fault tolerant group tables 141 in the relevant nodes are updated accordingly, and when the moved process begins executing in the new node, the status tables 207 in the system are updated as previously described.

To on-line add or delete a fault tolerant process in the system, we use addwatch <name or pid> <path> <port> <node> <time> [<files>] delwatch <name> where the <node> is the primary node on which the process <name> is running. <node> is the system name of a node or the name local, which is a keyword stands for the local machine name. <port> is the socket port number that the process is using (0 if no socket). <path> gives the full path to where the binary of the process <name> or <pid> can be found. This information is needed when the argument, <files>, is a list of files that contain process state copies 315. For example, a process yd is running on machine gryphon. To have the watchd daemon to watch the process, we can use addwatch yd /usr/local/bin/yd 0 gryphon 0

Again, execution of these commands results in alterations to tables 139, 141, and 207.

To on-line add or delete a node in the system, we use addnode <node>
    delnode <node>

In response to these commands, all daemons 104 modify their node lists 205 and those daemons which are directly affected by the reconfiguration of ring 211 transfer process state copies 315 and modify fault tolerant processes table 139 and fault tolerant group table 141 as required by the reconfiguration. In the case of the deletion of a node 203, entries for processes 103 running on the node are removed from status list 207.

8.2 libft 113 Functions used in Systems 101 and 201

The following discussion of libft 113 functions used in systems 101 and 201 will begin with functions used in the checkpoint and recovery operations, will continue with functions used for interaction with watchd daemon 104, and will conclude with functions which use the process ports listed in status table 207 to provide a fault-tolerant socket mechanism.

Checkpoint is a basic technique for recovery in libft. A program, when it is in a safe state, checkpoints its status onto a stable storage. If an unexpected condition occurs in execution of the program later, the system can restore the safe state and recover from the error.

In prior-art fault tolerant systems, a checkpoint has generally saved all data in the address space of a process onto stable storage. If a process has a large among of data, a checkpoint can be very time consuming. To improve checkpoint efficiency, libft provides a mechanism which allows users to specify critical data structures and variables. When a checkpoint is needed, only these critical data are saved.

8.3 Specifying critical data

Variables of simple types can be declared critical by using function critical().

8.3.1 Functions for declaring critical variables void critical([addr, size,]*,0) /* declare critical data */
    [char *addr; int size;]
    void t_critical(threadid,[addr, size,]*,0) /* declare critical data */ int threadid;
    [char *addr; int size;]
    void uncritical([addr]*,0) /* undeclare critical data */
    [char *addr];
    void t_uncritical(threadid,[addr]*,0) /* undeclare critical data */ int threadid;
    [char *addr];
    void all_critical() /* declare all data are critical */
    void all_uncritical() /* undeclare all critical data */
    void save-all-global() /* save all global variables */

Function critical () and function t_critical identify the storage pointed to by the argument addr as storage which is part of critical memory 115 and therefore is to be copied to critical memory copy 125 when a checkpoint operation is performed. The arguments of these two functions consist of 0 or more pairs of a pointer, which points to a variable, and an integer, which is the size of the variable pointed toby the pointer. The argument list is terminated with an unpaired 0. Function t_critical() registers critical variables for a thread in a process. The threadid is an integer which can range from 0 to _FTMAXTHREAD, a parameter defined in libftint.h. Function critical( ... ) is equivalent to function t_critical (0, ... ).

Function uncritical() removes the identified storage from critical memory 115. The arguments of this function consist of a list of addresses of variables which are no longer to be part of critical memory 115 and therefore no longer to be copied by the checkpoint operation. The last argument must also be an unpaired 0. Function t_uncritical() removes storage from critical memory 115 for a thread in a process 103.

The function all_critical() places all of process 103's variables into critical memory 115. Similarly, the function all_uncritical() removes all of the variables for process 103 from critical memory 115.

Function save_all_lobal() is used to save all global variables for a process 103. This function is implemented by means of a tool called glbgen, which creates a list of global data from the c database generated by the well-know cia program analysis tool.

8.3.2 Functions for managing critical memory libft also provides functions for specifying an area of memory 105 as belonging to critical memory 115 and then allocating and freeing portions of the area which belongs to critical memory 115. The functions are the following:

void ft_start(cp,size) char *cp;
    int size;
    char *ftmalloc(size) unsigned int size;
    char *ftrealloc(ptr,size) char *ptr;
    unsigned int size;
    char *ftcalloc(nelem,elsize) unsigned int nelem, elsize;
    char *ftfree(ptr) char *ptr;

Function ft_start() is used to designate part of virtual memory 105 as belonging to critical address space 115. The size of the memory to be designated is given by the parameter size. If the size is negative, a default size of 64 k bytes will be given. If the size originally designated is not sufficient, size of critical memory 115 is automatically grown as needed. To get space from critical memory 115, we use functions ftmalloc(), ftcalloc() or ftrealloc(). Their usages are the same as for the UNIX operating system functions malloc(), calloc() and realloc(). To return space to critical memory 115, we use the function ftfree(). Its usage is the same as the UNIX operating system function free().

8.4 Checkpoint and recovery functions

Programs being executed by a fault-tolerant process 103 use the libft function checkpoint() function to copy critical memory 115 to critical memory copy 125 and the recover() function to restore the contents of critical memory 115 from critical memory copy 125.

8.4.1 Synopsis

```
#include <ft.h>
int checkpoint(flag) int flag;
int t_checkpoint(threadid,flag) int threadid;
int flag;
int recover(flag) int flag;
int t_recover(threadid,flag) int threadid;
int flag;
void ftdup()
void setstafile(fname) char *fname;
int rmcheckpoint(index) int index;
int criticalsize(threadid) int threadid;
```

In a preferred embodiment, critical memory copy 125 may be either maintained in a file or in a portion of virtual memory 105 which is persistent. The integer "flag" indicates which option is to be used. When function t_checkpoint() is executed, all of critical memory 115 is copied to critical memory copy 125. If the checkpoint is successful, function t_checkpoint () returns 1; otherwise, it returns −1; When function t_recover() is executed, all of critical memory 115 is recovered from critical memory copy 125. If the recovery is successful, function recover() returns 1; otherwise, it returns −1;

In general, when the user specifies that critical memory copy 125 is to be established on a file, libft provides a name for the file at runtime. However, a user can provide his own name as an argument for the functions ft_start() or setstafile(); The threadid parameter is used in t_checkpoint and t_recover to checkpoint and recover critical memory 115 for each thread. It is useful when we need to keep a history of checkpoint files or when we use the checkpoint mechanism in a multiple-thread environment. If there is no multiple-thread usage, threadid should be given the value 0. Function rmcheckpoint() is to remove a checkpoint file. This is useful when the checkpoint mechanism is used as a semaphore.

Function checkpoint(flag) is equivalent to t_checkpoint (0,flag). Similarly, function recover(flag) is equivalent to t_recover(0,flag). Function criticalsize() returns the size of checkpointed critical data for a thread. It takes threadid as a parameter. If there is no checkpointed critical data, it returns 0.

Function ftdup() specifies that whenever data is checkpointed from critical memory 115 to critical memory copy 125, a message will be sent from process 103 to state srvr 303 specifying that critical memory copy 125 is to be copied to backup nodes 203. If no ftdup() function is called before checkpointing, no copying to backup nodes 203 is done.

8.4.2 Example

The following example demonstrates how the checkpoint() and recover() functions can be used in a sort function.

```
void sort(ary)
int ary[MAXLEN];
{
    critical(ary,sizeof(ary),0);
    checkpoint(INFILE);
    supersort(ary);
    if(!sorted(ary)) {
        recover(INFILE);
        quicksort(ary);
        if(!sorted(ary)) {
            recover(INFILE);
            bubblesort(ary);
            if(!sorted(ary)){
                error("All versions fail.");
                exit(1);
            }
        }
    }
    uncritical(ary,0);
}
``` sorted() is a function which returns 1 if the array in the argument list is sorted.

The input is an unsorted array. Three sort subroutines may be called from this function—supersort(), quicksort() and bubblesort(). Before calling a subroutine, the program uses the critical function to establishe the storage for the input array as critical memory 115 and then checkpoints the unsorted array from critical memory 125 to critical memory copy 125. Then, supersort() is called first. At the end, the array is examined. If it is sorted, the function returns normally. Otherwise, the unsorted array is restored from critical memory copy 125 and quicksort() is called. The result of quicksort() is examined again. If the result is not correct, the array is restored and bubblesort() is called. If none of the subroutines gives a correct answer, the program exits with an error.

8.4.3 Automatic message logging

As previously indicated, fault tolerant process 127's process state may include logfile 127. The libft functions for setting up and using logfile 127 in a preferred embodiment are the following:

```
#include <ft.h>
void logfile(fname) char *fname;
int ftread(fd,buf,size) int fd;
char *buf;
int size;
int ftwrite(fd, buf, size);
int fd;
char *buf;
int size;
```

The logfile function establishes the file specified by fname as logfile 127 for a process 103. If a program wishes to record data it is reading on logfile 127, the program uses the ftread function. The function's usage is the same as that of the UNIX operating system read function, except that all data which are read by the program are also logged onto a log file. The log entry made by ftread includes the data and the file descriptor. When the program is in a recovery state, the program reads the data in the file descriptor's entries from the logfile before beginning to read from the file specified by the file descriptor. The log file is truncated every time a checkpoint() function is executed. Function ftwrite() is like an ordinary UNIX operating system write function, except that it writes nothing when the process 103 executing the ftwrite function is in recovery mode. The ftwrite function thus prevents writes which have already been performed from being duplicated while a process 103 is recovering.

Combining ftread(), ftwrite() and checkpoint() functions, we can implement an efficient fault tolerant program with a periodic checkpointing and no loss of any data. An example will be presented later in the section.

8.5 libft Functions for Managing watchd Daemon 104 libft 113 includes a number of functions for managing watchd daemon 104. Among them are a function for registering a process 103 with daemon 104, a function for providing a heartbeat signal from process 103 to daemon 104, and functions which manipulate process state copies 315.

8.5.1 Registering a Process 103 with Daemon 104

The function regwatch registers a process 103 with daemon 104. After registration, daemon 104 will start watching process 103.

int regwatch(proc,port,time) char *proc;
    int port;
    int time;

The function takes three parameters, proc is the process name, port is the port number that the process is using for interprocess communication (0 if the process does not use a port), and time is to define the maximum timeout. Execution of the function results in a message to state srvr 303, which uses the parameters to create entries in fault tolerant processes 139 and status table 207 for the process 103 and sends messages to the other daemons 104 so that those daemons can update their status tables 207. The parameters are used for fields 407, 409, and 415 in fault tolerant processes list entry 405 for process 103. If there is no need for the watchd daemon to detect whether the process 103 has hung, we can let time=0.

8.5.2 Sending heartbeat signals to watchd daemon

As previously mentioned, state srvr 303 can listen for "heartbeat" signals from a process 103. Such signals are produced by the libft function hbeat(). Function hbeat() takes an integer value as an argument. The value specifies the maximum interval for which state srvr 303 should wait for a heartbeat signal from process 303. If state srvr 303 does not receive a heartbeat signal within the interval, state srvr 303 considers the process 103 hung and restarts it.

8.5.3 Obtaining Information from watchd daemon 104 libft 113 includes many functions which permit a process 103 to obtain information from daemon 104. The functions include the following:

char *getsvrloc(svr_name) char *svr_name;
    int in_recovery()
    int copytobkp(path) char *path;
    int copyfromprimary(path) char *path;
    int fastcopys(machinename,path) char *machinename;
    char *path;
    int fttermsig(sig) int sig;
    int regwatch(proc,port,time) char *proc;
    int port;
    int time;

Function getsvrloc() returns the node 203 on which process 103 whose name is svr_name is presently running. If process 103 is running on no node, the function returns a NULL pointer.

A process has two states—normal state and recovery state. When a process is restarted by watchd daemon 104, daemon 104 sets a value which indicates that the process 103 is in the recovery state. It remains in the recovery state until it has successfully executed the recover function. On completing execution, the recover function sends a message to daemon 104 to set the value which indicates the recovery state to indicate the normal state. The function in_recovery() permits a process 103 to determine whether it is in the normal state or the recovery state. The function sends a message to daemon 104, and daemon 104 responds by indicating which state the process 103 is in.

Function copytobkp() is used to send a message to state srvr 303 to atomically copy a file or a directory onto backup nodes 203. If the argument is a directory, all files (including directories) under that directory are copied to backup nodes. The function is useful when a process 103 has to maintain consistency of replicated files or directories between the primary and backup machines. Note that no backup machine name is needed because daemon watchd 104 determines where the backup machines for process 103 are from the configuration of ring 211 as defined in node list table 205.

Similarly, function copyfromprimary() is used to copy a file (or a directory) from the primary node 203 as specified in the entry for process 103 in fault tolerant processes table 139 onto the local node 203. The copying is done by the state srvr processes 303 in the nodes 203 concerned. Similarly, function fastcopys() copies a file (or a directory) from the node machinename onto the local node 203. Both functions return 0 if the copy is successful. Otherwise, it returns −1;

When a process 103 is running on one node 203 and must be restarted on another node 203, the process must be terminated on the first node 203 before it can be restarted on the second node. The termination signal is sent by watchd daemon 104 in the first node 203. In order to send the termination signal, daemon 104 must know what termination signal the process 103 expects. The function fttermsig() permits a process 103 to declare what signal it expects. For example, if a process wants to catch signal SIGUSR1 for termination, it can use statement fttermsig(SIGUSR1) at the beginning of the program. In this case, daemon watchd 104 sends the process signal SIGUSR1 to terminate the process. If no termination signal is declared, a default termination signal, SIGTERM, is sent.

8.5.4 Fault tolerant socket mechanism

The port which watchd daemon 104 uses to communicate with a fault-tolerant process 103 can also be used to establish fault tolerant socket connections to fault-tolerant processes 103. The following libft functions adapt a fault-tolerant process 103's port to this purpose.

include <sys/types.h>
    #include <sys/socket.h>
    int ftconnect(s, name, namelen) int s;
    struct sockaddr *name;
    int namelen;
    int ftbind(s, name, namelen) int s;
    struct sockaddr *name;
    int namelen;
    int ftsend(s,msg,len,flags) int s;
    char *msg;
    int len,flags;
    char *getsvrbyport (port_no) int port_no;
    int getsvrport(name) char *name;

Function ftconnect() connects a client process to a server process which is a fault-tolerant process 103. It first queries watchd daemon 104 to get the port number of process 103 from status table 207 and then connects the client process to the process 103. The usage of ftconnect() is the same as that of the UNIX operating system connect() function. Function ftbind() assigns a name to an unnamed socket. It sends a message to daemon 104 to obtain the port number of process 103 from status table 207 and then uses a UNIX operating system function to bind the name to the port number renturned by daemon 104. The usage of the function is the same as the bind() function. Function ftsend() sends a message to the socket corresponding to the port number in the process 103's status table entry 501. If the transmission fails, it will automatically reconnect the socket and resend the message. The usage of the function is the same as that of the UNIX operating system function send().

Function getsvrbyport() returns the node upon which the process 103 which uses the port number port_no for socket communication is presently running. If no process 103 is using this given port number, the function returns a NULL value. Function getsvrport() returns the port number in the status table entry 501 for the process. It returns −1 if watchd daemon 104 cannot find the port number for the process.

8.5.5 Example

The following example demonstrates a server program that runs in a fault-tolerant process 103 and uses libft for checkpoint and recovery. The server program reads an input from a client and pushes the number on top of a stack. The stack is implemented as a linked list.

```
#include <ft.h>
...
struct llist {
        struct llist *link;
        int data;
}
...
main( ){
        struct llist *ptmp,*pHead=NULL;
        int s,indata,cnt=0;
        ...
        ft_start("example.state", (1>>16));
        ftdup( );
        fttermsig(SIGTERM);
        logfile("example.log");
        critical(&pHead, sizeof(pHead), 0);
        ...
        if (in_recovery( )) recover(INFILE);
        for (;;) {
                hbeat(10);
                if (cnt>200) {
                        checkpoint (INFILE);
                        cnt=0;
                } else cnt=cnt+1;
                if (!in_recovery) accept(...);
                ftread(s,indata,MaxLen);
                ptmp=(struct llist *) ftmalloc(sizeof(struct llist));
                ptmp->link=pHead;
                ptmp->data=indata;
                pHead=ptmp;
                ...
                ...
        }
}
```

The critical data of the above example are the stack and the pointer to the top of the stack, pHead. The pointer is placed in critical memory 115 by the critical(&pHead, sizeof(pHead),0) function invocation. In order to place the stack in critical memory 115, the program has to declare an area of critical memory 115 using ft_start and then allocate from it using ftmalloc.

The execution of ftdup() causes all checkpointed data to be propagated to backup nodes 203 as determined by the current configuration of ring 211. Function in_recovery() returns 1 when the program is restarted by daemon watchd. It remains 1 until function recover() is executed and all logged data are consumed. After that, function in_recovery() always returns 0. The program executes a checkpoint every 200 messages. All incoming messages are logged onto a file called example.log. When the program is in a recovery mode, data are read from the logged file, not from the file descriptor s. The program defines SIGTERM as the termination signal by using function fttermsig (SIGTERM). To send heartbeat signals to watchd daemon, function hbeat() is used.

9 Using watchd and libft to Make a Program Fault-Tolerant

The general method of converting a server program so that it can be executed by a fault-tolerant process 103 is the following:

1. insert checkpoint() and recover() functions at proper places;
2. define critical variables and data structures;
3. change malloc() to ftmalloc(),realloc() to ftrealloc() and free() to ftfree() for critical memory allocation;
4. compile and link the server program with libft;

The above procedure has been used to convert the Yeast server program. Yeast (Yet another Event-Action Specification Tool) (described in D. S. Rosenblum and B. Krishnamurthy, "An event-based model of software configuration management", in: *Proceedings of the 3rd International Workshop on Software Configuration Management*, pp. 94–97, ACM Press, June, 1991) is a tool that provides services for automating frequently-performed software development tasks. It accepts event-action specifications from users and automatically invokes the specified action when it recognizes an occurrence of the specified event pattern.

The Yeast tool is based on the client-server model in which clients submit and manipulate event-action specifications and a server process, named yeastd, performs specification matching and management. The communication between the server and clients is based on a BSD socket mechanism in which the server sits on a predetermined host and waits for requests at a well-known port. The original implementation of yeastd is not fault tolerant: if the node upon which the server is executing fails, yeastd can no longer provide services, even though there are other working nodes in the network. When the failed node is repaired, yeastd can only be restarted from its initial state. Event specifications submitted before failure may be lost.

To make the yeastd process fault tolerant, we used the above procedure to convert the yeastd program into ftyeastd program. Yeast is a fairly complex system. It has more than 20 source files and over 40 thousand lines of C code. The first step was to identify the right places to insert checkpoints and recovers functions. By reading through the source program, we quickly identified the place where the server became idle. A checkpoints function and a recovers function were inserted at that place. The next step was to find out all critical data structures and variables. This step was harder for us because we knew very little about the internal data structures of the program when we started. We carefully traced the source program and identified about 25 critical variables. These variables were declared critical by using the critical() function. The next step was to change malloc() into ftmalloc() and free() into ftfree() in allocating and freeing memory space for critical data structures. The is done by defining malloc=ftmalloc and free=ftfree in makefile. A ft_start() function was inserted at the beginning of the server program to create a critical memory space for critical data. Finally, the new source program was compiled and linked with the libft library.

After completion, the total number of new lines added to the source code was about 40. The whole procedure took us about 4 days. Most of the time was spent on debugging and testing. Conversion would have been much more rapid if we had a full knowledge of the source program when we started. The new server, ftyeastd, has been shown to be able to tolerate any node failure in the system and continue to provide its services.

In the first prototype of the ftyeastd server, checkpoint is inserted whenever there is an internal state change in the system. The checkpoint overhead can be reduced if we checkpoint the server according to some optimal checkpoint frequency. How to analyze a system and derive the optimal checkpoint frequency can be found in Yennun Huang, supra. To recover the state of the server, we can keep a message log on backup nodes. When a primary-copy failure occurs, this message log is executed by a backup node (the new primary) to recreate the server's state.

10 Conclusion

The foregoing Detailed Description has disclosed to those of ordinary skill in the art how a fault tolerant computing system may be built which does not require special fault-tolerant hardware or a fault-tolerant operating system, but is instead based on a daemon which is implemented using ordinary user processes and a library of fault-tolerant functions. The techniques disclosed herein are not only less costly than those involving special hardware or operating systems, but also give the application programmer a measure of flexibility unknown in the prior art. Further, when employed in a system with a plurality of nodes, they provide a degree of fault tolerance which is often no less than that provided by special hardware or operating systems.

While the embodiment described in the Detailed Description is the best mode presently known by the inventors for implementing their invention, it will be immediately apparent to those of ordinary skill in the art that many variations on the described embodiment are possible. For example, libft in another embodiment may contain more or fewer functions, and those functions may have different semantics from those of the present embodiment; further, watchd may have a different architecture and different tables may be used to record the status of nodes and processes; additionally, configurations of daemons and nodes other than ring 211 may be used, and other protocols may be employed to keep the tables in the nodes consistent.

For these reasons, the foregoing Detailed Description is to be regarding as being in all respects illustrative and exemplary, and not restrictive, and the scope of the inventions disclosed herein is to be determined solely by the following claims as interpreted in light of the Specification and according to the doctrine of equivalents.

What is claimed is:

1. Fault-tolerant computing apparatus for use in a computer system, said apparatus comprising:
   a monitor for observing the state of a process executing on a processing unit in the computer system and restarting the process when the process is observed to be unable to continue executing, and
   a plurality of fault tolerant library routines, a selected one or ones of said fault tolerant library routines being invocable by said process to provide said process with a corresponding one of a plurality of degrees of fault tolerance such that said observing by said monitor is performed in accordance with said selected fault tolerant routine.

2. The apparatus set forth in claim 1 wherein:
   execution of said selected fault tolerant library routine or routines is in response to an invocation of the routine by the process.

3. The apparatus set forth in claim 1 wherein:
   said selected fault tolerant library routine or routines includes routines which define and save critical memory used by the process and which restore the critical memory when the process is restarted.

4. The apparatus set forth in claim 1 wherein:
   said selected fault tolerant library routine or routines includes routines which define and maintain a logfile of read operations for the process which operations are repeated when the process is restarted.

5. The apparatus set forth in claim 1 wherein:
   said selected fault tolerant library routine or routines includes a routine which registers the process with the monitor.

6. The apparatus set forth in claim 1 wherein:
   said selected fault tolerant library routine or routines includes a routine which, when executed, sends a signal to the monitor; and
   the monitor determines that the process is unable to continue if the monitor does not receive the signal within a predetermined period of time.

7. The apparatus set forth in claim 6 wherein:
   the routine which sends the signal further sends a value indicating a predetermined time for a next signal.

8. A computer system for fault tolerant computing comprising:
   at least one processor for executing user level processes;
   a first user level process executing on said at least one processor;
   a user level daemon process executing on said at least one processor;
   means for providing a registration message specifying said first user level process to said user level daemon process, said user level daemon process being responsive to said registration message by initiating observation of said first user level process to determine whether said first user level process is unable to continue execution and for restarting said first user level process when said first user level process is observed to be unable to continue execution.

9. The computer system of claim 8 further comprising:
   a plurality of fault tolerant library routines, each of said routines being executable by said first user level process.

10. The computer system of claim 9 wherein:
    the fault tolerant library routines include routines which define, save, and restore memory used by said first user level process.

11. The computer system of claim 9 wherein:
    the fault tolerant library routines include routines which define and maintain a logfile of read operations for said first user level process, which operations are repeated when said first user level process is restarted.

12. The computer system of claim 9 wherein said means for providing a registration message comprises a fault tolerant library routine.

13. The computer system of claim 9 wherein:
    the fault tolerant library routines include a routine which, when executed, sends a signal to said user level daemon process; and
    the user level daemon process determines that said first user level process is unable to continue execution if said user level daemon does not receive the signal within a predetermined time period.

14. The computer system of claim 13 wherein:
    the routine which sends the signal further sends a value indicating said predetermined time period.

15. The computer system of claim 8 further comprising:
    a fault tolerant group table specifying a group of user level processes to which said first user level process belongs, said user level daemon being responsive to said fault tolerant group table for restarting each user level process specified in said group at the same time at which said user level daemon restarts said first user level process.

16. The computer system of claim 8 wherein said user level daemon process comprises:
    a first daemon process for using polling to determine whether said first user level process is unable to continue execution; and a second daemon process for restarting said first user level process when the first daemon process determines that said first user level process is unable to continue execution.

17. A computer system for fault tolerant computing comprising:

a plurality of nodes, each of said nodes comprising at least one processor for executing user level processes;

a first user level process executing in a first one of said nodes;

a first user level daemon process executing in a second one of said nodes for actively polling said first one of said nodes for determining whether said first one of said nodes is inoperable, and for restarting said first user level process on said second one of said nodes when said first user level daemon process determines that said first one of said nodes is inoperable;

a second user process executing in said second one of said nodes, wherein said first user level daemon further observes whether said second user process is unable to continue execution and restarts said second user level process on said second one of said nodes when said second user level process is observed to be unable to continue;

a second one of said user level daemon processes executing on said first one of said nodes, said second one of said user level daemon processes copies state information from said first user level process to said first user level daemon process, and said first user level daemon process employs said state information in restarting execution of said first user level process; and computer program code executed by said first user level process, said computer program code comprising a first fault tolerant library routine which, when executed, saves said state information.

18. A distributed computer system for fault tolerant computing comprising:

a plurality of nodes, each of said nodes comprising:

at least one processor for executing user level processes;

a user level daemon process executing on said at least one processor;

means for providing a registration message specifying a user level process to said user level daemon, said user level daemon being responsive to said registration message by initiating observation of a specified user level process to determine whether said specified user level process is unable to continue execution and for restarting said specified user level process when said specified user level process is observed to be unable to continue executing; and wherein a first one of said user level daemon processes executing in a first one of said plurality of nodes further observes whether a second one of said plurality of nodes is operating.

19. The distributed computer system of claim 18 wherein said second one of said plurality of nodes is executing a first user level process; and wherein said first one of said user level daemon processes responds to a failure of said second one of said plurality of nodes by starting execution of a process equivalent to said first user level process on said first one of said plurality of nodes.

20. The distributed computer system of claim 19 wherein:

a second one of said user level daemon processes executing on said second one of said plurality of nodes copies state information from said first user level process to said first one of said user level daemon processes;

and wherein said first one of said user level daemon processes employs said state information in starting execution of a process equivalent to said first user level process.

21. The distributed computer system of claim 20 wherein each of said nodes further comprises:

computer program code executable by said user level processes, said computer program code comprising a first fault tolerant library routine which, when executed, saves user level process state information.

22. The distributed computer system of claim 18 wherein the user level daemon process in each of said nodes further comprises:

means for deleting a second user process which is equivalent to a first user level process if said user level daemon determines that said first user level process is executing on an associated primary node and said second user process is executing on a node other than said primary node.

23. The distributed computer system set forth in any of claims 18, 19, or 22 wherein:

said nodes being arranged such that each of said nodes is observed by a single one of said user level daemons and each of said user level daemons observes a single one of said nodes.

24. The distributed computer system of claim 23 wherein each of said user level daemons further comprises means for maintaining said arrangement when a node observed by the user level daemon fails.

25. A method for operation of a fault tolerant computer system, said system comprising at least one processor for executing user level processes, said method comprising the steps of:

providing a registration message specifying a particular user level process which is executing on a processor to a user level daemon process, said user level daemon process being responsive to said registration message for performing the steps of:

monitoring said specified user level process to determine whether said specified user level process is unable to continue executing; and restarting said specified user level process if said specified user level process is unable to continue executing.

26. The method of claim 25 wherein said step of providing a registration message further comprises the step of executing a fault tolerant library routine.

27. The method of claim 25 wherein said specified user level process performs the step of:

sending a signal to said user level daemon process, and wherein said step of monitoring further comprises the step of:

determining that said specified user level process is unable to continue if said user level daemon does not receive said signal within a predetermined time period.

28. The method of claim 25 wherein said fault tolerant computer system further comprises a fault tolerant group table specifying a group of user level processes to which said specified user level process belongs, said user level daemon process further responsive to said fault tolerant group table for performing the step of:

restarting each user level process specified in said fault tolerant group table at the same time as when said user level daemon process restarts said specified user level process.

29. A method for operation of a fault tolerant distributed computer system, said system comprising a plurality of nodes, each node comprising at least one processor for executing user level processes, the method comprising the steps of:

executing a first user level daemon process on a first node, said first user level daemon process performing the steps of:

monitoring a second node to determine whether said second node is inoperable, wherein said second node is executing a second user level process; and restarting said second user level process on said first node when it is determined that said second node is inoperable;

executing a third user level process on said first node; said first user level daemon process performing the further steps of:

monitoring said third user level process to determine whether said third user level process is unable to continue executing;

restarting said third user level process if said third user level process is unable to continue executing; and executing a second user level daemon process on said second node; said second user level daemon process performs the step of:

copying state information from said second user level process to said first user level daemon; said step of restarting said second user level process on said first node further comprises the step of:

restarting said second user level process using said state information.

\* \* \* \* \*